(12) United States Patent
Herold

(10) Patent No.: US 8,945,320 B2
(45) Date of Patent: Feb. 3, 2015

(54) BELT CONNECTOR AND METHOD
(75) Inventor: Wolfgang Herold, Offenbach (DE)
(73) Assignee: Mato Maschinen-Und Metallwarenfabrik Curt Matthaei GmbH & Co. KG, Offenbach (DE)
(*) Notice: Subject to any disclaimer, the term of this patent is extended or adjusted under 35 U.S.C. 154(b) by 694 days.
(21) Appl. No.: 12/993,226
(22) PCT Filed: May 12, 2009
(86) PCT No.: PCT/EP2009/003344
§ 371 (c)(1),
(2), (4) Date: Jan. 11, 2011
(87) PCT Pub. No.: WO2009/141071
PCT Pub. Date: Nov. 26, 2009
(65) Prior Publication Data
US 2011/0100896 A1  May 5, 2011
(30) Foreign Application Priority Data
May 21, 2008 (EP) .................................. 08009358
(51) Int. Cl.
*A41H 37/00* (2006.01)
*A44B 19/00* (2006.01)
(Continued)
(52) U.S. Cl.
CPC . *F16G 3/04* (2013.01); *F16G 3/003* (2013.01)
USPC ............ 156/66; 156/92; 156/298; 156/304.3; 198/844.2
(58) Field of Classification Search
CPC ........ B29C 66/00; B29C 66/01; B29C 66/05; B29C 66/20; B29C 66/22; B29C 66/227; B29C 66/303; B29C 66/3032; B29C 66/30325; B29C 66/30326; B29C 66/4722; B29C 65/00; B29C 65/02; B29C 65/18; B29C 65/48; B29C 65/4815; B29C 65/50; B29C 65/5042; B32B 37/00; B32B 37/04; B32B 37/12; B32B 37/1207; B32B 37/1215; B32B 37/1223; F16G 3/00; F16G 3/02; F16G 3/04

USPC ............. 156/60, 66, 73.1, 73.5, 73.6, 91, 92, 156/137, 148, 196, 216, 293, 297, 298, 156/304.1, 304.3, 304.5, 308.2, 309.6; 29/428, 525.01, 525.02, 525.03, 29/525.05, 525.08, 525.13, 525.15; 24/304, 31 R; 210/251; 198/804, 844.1, 198/844.2
See application file for complete search history.

(56) References Cited

U.S. PATENT DOCUMENTS 3,031,359 A * 4/1962 Blank et al. ............... 229/117.26
5,017,788 A * 5/1991 Humphrey et al. ........ 250/385.1
(Continued)

FOREIGN PATENT DOCUMENTS

DE     732524 B    3/1943
DE    1245908 C    8/1967
(Continued)

OTHER PUBLICATIONS

Non-English International Search Report for PCT/EP2009/003344 (4 pages).

(Continued)

*Primary Examiner* — Philip Tucker
*Assistant Examiner* — Brian R Slawski
(74) *Attorney, Agent, or Firm* — Price Heneveld LLP

(57) ABSTRACT

A belt connector and method for interconnecting opposite ends of a filtering belt has a plurality of wire hooks, each with two shanks disposed adjacent opposite faces of the belt, a coupling loop interconnecting the shanks and hook ends that are pressed into the opposite faces of the belt. A flat cover element extends across the width of the belt, covers at least portions of the wire hooks, overlies the opposite faces of the belt, and has a carrier material and a coating that is applied to the belt side of the carrier material, and is constructed from a thermoplastic or an adhesive material which is pressed into the pores of the belt to positively and mechanically interconnect the cover element with the belt.

14 Claims, 6 Drawing Sheets

(51) Int. Cl.
*B32B 7/08* (2006.01)
*B29C 65/00* (2006.01)
*B32B 37/00* (2006.01)
*B65G 17/00* (2006.01)
*F16G 3/04* (2006.01)
*F16G 3/00* (2006.01)

(56) References Cited

U.S. PATENT DOCUMENTS

| | | | | |
|---|---|---|---|---|
| 5,405,477 | A * | 4/1995 | Arnold | 156/304.3 |
| 6,627,045 | B2 * | 9/2003 | Raczkowski et al. | 162/348 |
| 6,896,124 | B2 | 5/2005 | Herold | |
| 2001/0054592 | A1 * | 12/2001 | Day | 210/783 |
| 2003/0150698 | A1 * | 8/2003 | Herold | 198/844.2 |
| 2005/0229995 | A1 * | 10/2005 | Ito et al. | 139/383 A |
| 2009/0057105 | A1 * | 3/2009 | Suelzle | 198/844.2 |

FOREIGN PATENT DOCUMENTS

| | | | |
|---|---|---|---|
| DE | 3642803 | A1 | 6/1988 |
| DE | 19526458 | A1 | 1/1997 |
| DE | 10029571 | A1 | 1/2002 |
| EP | 0682645 | A1 | 11/1995 |
| EP | 1338825 | A1 | 8/2003 |
| EP | 2101080 | A2 * | 9/2009 ............... F16G 3/00 |
| WO | 2007025567 | A1 | 3/2007 |
| WO | WO 2007025567 | A1 * | 3/2007 ............... F16G 3/04 |

OTHER PUBLICATIONS

Non-English PCT Written Opinion for PCT/EP2009/003344 (7 pages).

* cited by examiner

BELT CONNECTOR AND METHOD

CLAIM OF PRIORITY

Applicant hereby claims the priority benefits under the provisions of 35 U.S.C. §119, basing said claim of priority on PCT/EP20009/003344, claiming priority to EPC 080093586, filed May 21, 2008. In accordance with the provisions of 35 U.S.C. §119 and Rule 55(b), a certified copy of the above-listed EPC patent application will be filed before grant of a patent.

BACKGROUND OF THE INVENTION

The present invention relates to belt connectors of the type having wire hooks to interconnect the opposite ends of a belt. Each wire hook has two shanks arranged on opposite sides of the belt, and furthermore has hook ends adjoining the shanks, wherein the hook ends are pressed into the carcass of the belt. Each wire hook also has a coupling loop connecting the two shanks. The belt connector furthermore has a flat cover element that extends on both sides of the belt to cover portions of the hook assembly. The cover element extends across the width of the belt, and has a carrier material and a coating applied to the side facing the belt, that is made of a thermoplastic or an adhesive, especially a hot melt adhesive or an elastic adhesive, for attaching the cover element to the belt.

The invention furthermore relates to a method for producing such a belt connection.

A connection of the type cited in the foregoing is known from WO 2007 025567 A1. The wire hooks are held in a strip-like carrier material made of a textile fabric. One side of the carrier material is coated with an adhesive or provided with a thermoplastic. When the connection is made, heat generated by press jaws causes the carrier material and belt to fuse together. The cover element covers portions of the wire hooks and the belt end in order to prevent the wire hooks, especially damaged wire hooks, from damaging or otherwise having a negative effect on goods being conveyed on the belt.

Belt connectors embodied as wire hooks and connected to one end of a belt using a cover element that extends across the width of the belt are furthermore known from EP 1 338 825 A1. The belt is for instance embodied as a plastic belt, especially a polyurethane belt. The cover element is embodied as a fabric belt or plastic molded part and is provided with a layer of adhesive, especially a layer of hot glue, or an elastic adhesive. The wire hooks are attached to the belt and the cover element is added preferably in one operation, wherein the cover element is glued to the shanks of the hooks and the belt, especially using heat.

A method for pressing wire hooks into flat fabric comprising plastic is known from DE 36 42 803 A1. The shanks of the wire hooks are heated prior to bending. During bending the plastic of the flat fabric is partially plasticized and the wire hooks are pressed together, such that in their final pressed state, the exterior dimension of the shanks is never greater than the thickness of the flat fabric.

DE-PS 732 524 describes belt connectors that are embodied as wire hooks and connected to one end of a belt. The shanks of the wire hooks are embedded in a rubber cover layer of the belt. The belt comprises a fabric core and the rubber coatings. Producing such a connection is very complex because vulcanization is required in order to apply the rubber cover layers.

When joining belts, such as screen conveyor belts, press conveyor belts, filter conveyor belts, transport conveyor belts, and flat conveyor belts, it is known from DE 100 29 571 A1 to spray the end of the belt in a tool with a free-flowing material that consolidates when cooled. The material creates a permanent connection to the belt in the longitudinal direction of the belt at the given tensile forces. Each half of the belt joint is provided with alternating projections and recesses. The projections are provided with aligned channels through which a cotter pin can be passed. Substances used for the free-flowing materials are metals and plastics, such as thermoplastics, thermosetting plastics, and condensation resins, especially polyurethanes. Woven, knitted, laid, homogenous, and coated belts made of textiles, metal substances, plastics, and metal fabrics are also used commercially. Joining such belts in the manners described above is very complex, and in particular, is very time-consuming.

Devices such as that in accordance with EP 0 682 645 B1 are used for dewatering suspensions. These devices have belts that are made of a porous filtering web. The spaces in the filtering web can be used to dewater the suspension. Such a suspension is used for instance with sludge. Two conveyor belts are arranged relatively close to one another. They press the suspension between them during conveying so that the spaces in the belts are dewatered.

Such devices are also used for instance for extracting fruit and vegetable juices, dewatering draff, and producing algae and herbal extracts. The fluid is drained off by pressing the products between conveyor belts that are made of a filtering web.

With such devices, it is necessary to remove the filter cake after the dewatering has taken place. The filter cake is removed using wipers that contact the rotating belt. Thus, the wipers also contact those areas of the belt in which belt connectors and their covers are located. These areas are then subjected to increased wear, especially when material that has abrasive parts is being conveyed, for instance sand particles.

SUMMARY OF THE INVENTION

One object of the present invention is to ensure durable and wear-resistant attachment of the cover element to the belt in a connection of the type cited in the foregoing. Another object of the present invention is to provide a method that ensures, in a particularly simply manner, the connection of the wire hooks to the belt and the durable and wear-resistant attachment of the cover element to the belt. It should be possible to produce the connection in a short period of time.

The invention is particularly adapted for belts embodied as filtering belts, wherein the coating applied thereto passes at least partially through spaces in the filtering belt.

The invention takes advantage of the fact that the belt is embodied as a porous filtering belt, wherein the belt is embodied for the purpose of performing filtering processes by means of the belt. The belt is for instance provided as a fabric belt with warp and weft threads that form spaces or pores between them. Liquid portions of the product to be filtered can pass through the belt through these spaces. It is not necessary for this liquid to pass through in the area of the belt ends, where the wire hooks are to be connected to the belt. The cover is attached there. A coating applied to the carrier material deforms during heating, and when the cover element is applied such that the spaces in the filtering belt are at least partially filled by the coating material. Thus, there is a positive-fit or interlock connection between the applied coating and the filtering fabric, in that the deformed applied coating extends into the spaces or pores in the filtering belt in at least some areas thereof, and thus extends essentially vertical to the surface of the filtering belt for the product to be filtered. The cover is thus extremely well-suited for absorbing forces that act in the direction of tension for the belt. This is because the positive fit between the applied coating and the filtering belt transmits the force in this direction. This arrangement makes a significant contribution to creating the durable and wear-resistant attachment of the cover element to the belt.

The applied coating preferably passes into or through the spaces or pores on both sides of the filtering belt. Thus, it covers the wire hooks in the area of both shanks. It is particularly advantageous when the applied coating is fused into the belt spaces from both above and below the belt, that is, from both sides or faces of the belt. In this case, not only is the applied coating deformed on each side of the belt, it also projects into the spaces or pores of the filtering belt. In addition, those areas of the applied coating that project into each space of the filtering belt define fingers, such that when the connection is made, the heat and pressing force that is used on both sides of the filtering belt fuse together or unite the ends of these fingers of the applied coating that project into each of the belt spaces. Thus, the areas of the applied coating are positively and mechanically joined or interlocked, and this connection is thereby very secure after the areas cool. The areas of the cover element that are arranged on both sides of the belt are thus securely connected to one another via the applied coatings via the spaces or pores in the belt.

The belt preferably comprises plastic, metal, or a nonwoven material, specifically a felt, especially a felt made of plastic. When creating the belt from plastic, it is considered particularly advantageous when it comprises polyester or nylon. Particularly good filtering properties with a very simple composition of the belt result when the belt is a filtering fabric. The latter comprises especially monofilament fibers and/or spun fibers.

The belt, especially the fabric, preferably has a melting point that is in particular significantly higher than the melting point of the applied coating. The melting point of the applied coating is for instance 180° C., while the melting point of the fabric is 220° C. This means that when the applied coating is molten, especially when it is in a paste-like state, the fabric has not reached its melting point. This is particularly important because the belt should be prevented from reaching its melting temperature, which would cause it to deform and remain in this deformed condition after cooling. Deformation is disadvantageous from the perspective of guiding the belt over deflection rollers for the belt. Deformation of the belt furthermore has a negative effect on its tensile properties.

The belt is made in particular from a filtering fabric of monofilament fibers and/or spun fibers. Monofilament fibers are used in one direction, for instance, and multifilament fibers are used in the other direction.

From the perspective of enhancing the resistance of the connection to wear, it is considered particularly advantageous when an additional cover element is connected to the cover element on its side facing away from the belt. This additional cover element reinforces the thickness of the cover stratum that is formed by the two cover elements. As a rule, the cover elements comprise the same material. Both have the carrier material and the coating applied thereto. The additional cover element is attached by means of the applied coating of the additional cover element to the carrier material of the cover element that is attached directly to the belt.

The additional cover preferably extends in the longitudinal direction of the belt beyond the end areas of the other cover, and thus beyond the cover that covers the belt directly. Because of this configuration, when the belt rotates there is a leading incline of the additional cover element, starting from the belt. This incline means the thickness of the double cover elements does not create or constitute a step.

With regard to the cover and/or additional cover, it is considered particularly advantageous when their carrier material constitutes a fabric. While in particular the fabric of the belt has a wide mesh for attaining the filtering property, the fabric for the cover and/or the additional cover is in particular fine-meshed. However, this fabric should also have spaces, even if they are small. When the two cover elements are connected, the applied coating for the additional cover element can pass through the spaces in the carrier element of the cover element connected to the belt so that it can create a positive-fit connection to the carrier material for the cover connected to the belt. It may even cause the two applied coatings for the cover elements to connect physically.

In order to prevent plasticization of the carrier material for the cover and/or the additional cover during the plasticization of the two applied coatings, which are especially thermoplastic, the melting point of the carrier materials should be higher than the melting point of the applied coating. The carrier material for the cover and/or the additional cover in particular comprises polyester or nylon. The carrier material for the cover and/or the additional cover preferably constitutes a fabric made of monofilament fibers and/or spun fibers.

The cover element can completely or even only partially cover the shanks of the wire hooks. The cover element and/or the hook arrangement in particular extend across the entire width of the belt. The belt may be quite wide; for instance, it may be up to 3 meters wide.

One object of the present invention is furthermore attained using a method for connecting belt connectors embodied as wire hooks to one end of a belt, wherein each wire hook has shanks that are arranged on opposite sides of the belt. Each wire hook also has hook ends that adjoin the shanks and that can be pressed into the belt, wherein each wire hook has a coupling sleeve that connects the two shanks. The method also connects belt connectors to a flat cover element that is for the hook arrangement, that is arranged on both sides of the belt, and extends across the width of the belt. The cover element has a carrier material and a coating that is applied thereto on its side facing the belt, and is made of a thermoplastic or an adhesive, especially a hot melt adhesive or an elastic adhesive, for attaching the cover element to the belt. The method has the following steps:

The wire hooks held in the cover element are pressed into a belt embodied as a filtering belt; and Then the applied coating is heated and the plasticized material is connected to the filtering belt under pressure.

In particular, the method produces the connection specified according to the aforesaid solution. This connection presses the wire hooks held in the cover element into the filtering belt. The applied coating is heated and plasticized material from the coating is pressed into the spaces of the filtering belt.

In particular it is provided that after the wire hooks with the cover are pressed in, they are heated in a separate workstation under relatively low pressure. Then, immediately thereafter, in another workstation, the plasticized applied material of the coating is pressed into the spaces of the filtering belt under relatively high pressure and then cooled. The plasticization of the applied material of the cover can be attained using different methods, such as for instance friction, irradiation, ultrasound, heating plates, hot air, or the like.

The wire hooks are preferably clenched or pressed closed at a pressure of 15.0 to 35.0 N/mm$^2$ and/or the cover element is heated at a pressure of 0.2 to 0.6 N/mm$^2$ and/or the plasticized material of the coating is pressed into the spaces at a pressure of 5.0 to 25.0 N/mm$^2$.

The invention thus proposes a connection of belt connectors embodied as wire hooks to one end of a filtering belt using a cover element and proposes a method for producing the connection, wherein in particular:

The product of the thickness of the applied material for the cover and the surface area of the cover is approximately equal to (at least) the volume of the spaces of the filtering belt;

The thickness of the applied material for the cover is selected such that the coating for the top side fuses with the coating for the bottom side when heat is applied and the connection is produced;

Adequate protection against wear is attained in that a plurality of layers of fabric that are connected to one another by applied coatings are arranged on top of one another;

Adequate protection against wear is attained by using a relatively thick fabric having some monofilament fibers; and After the connectors with the cover for them have been pressed in, they are heated under relatively low pressure in a separate station and immediately thereafter plasticized applied material for the cover is pressed into the spaces of the filtering belt under relatively high pressure in another workstation and cooled.

The applied material is in particular a thermoplastic, and the filtering belt is a fabric belt made of plastic.

Additional features of the invention are depicted in the subordinate claims, the description of the figures, and the figures themselves. It is hereby noted that all individual features and all combinations of individual features are essential to the invention.

The invention is depicted using a plurality of exemplary embodiments without being limited thereto.

DETAILED DESCRIPTION OF THE PREFERRED EMBODIMENTS

Figure 1:
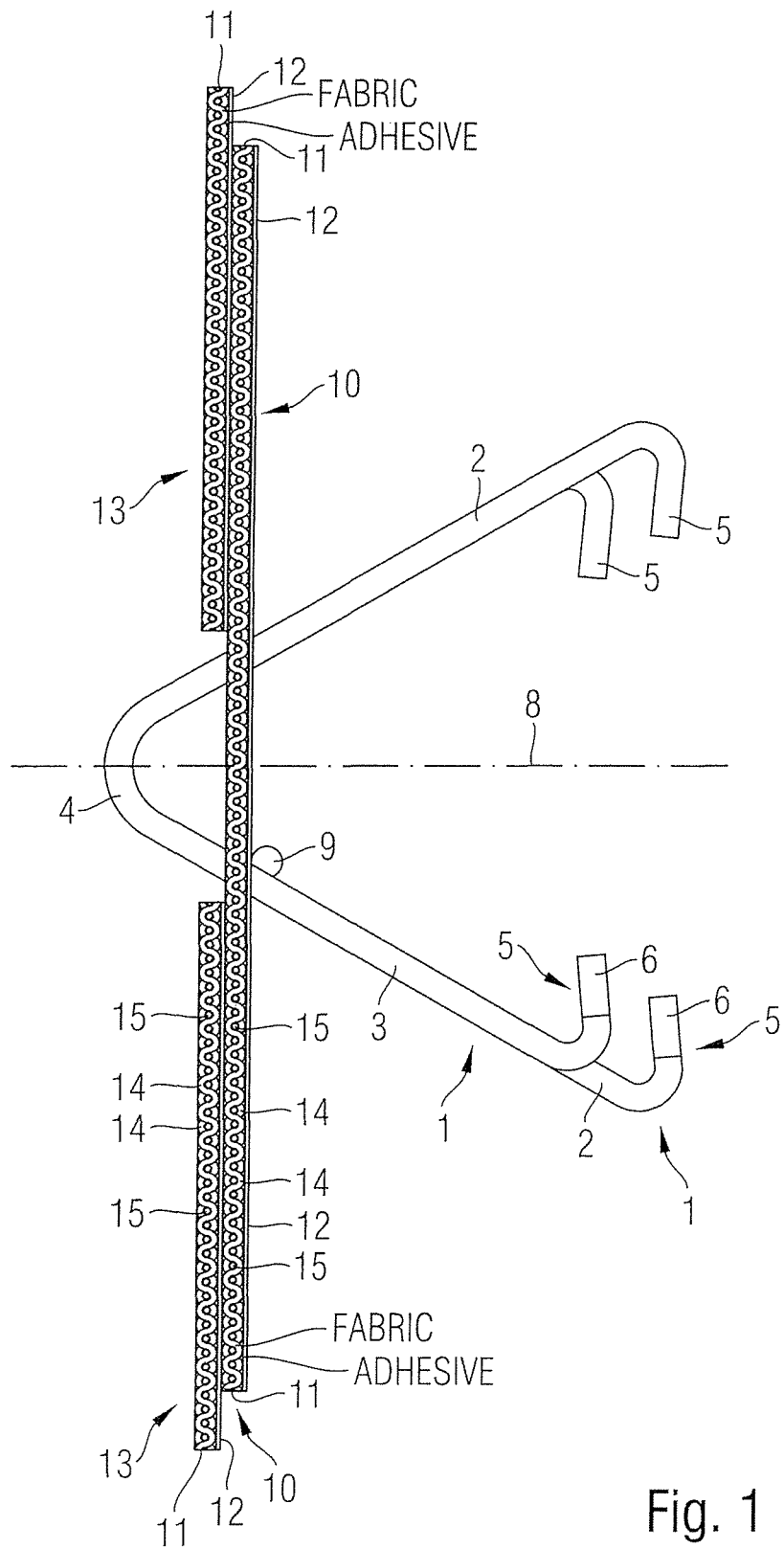
FIG. 1 illustrates a first exemplary embodiment of the invention, and depicts a side view of an arrangement of wire hooks held by means of a cross wire; the arrangement is used in a cover element, another cover element being connected to the cover element.
Figures 3, 4:
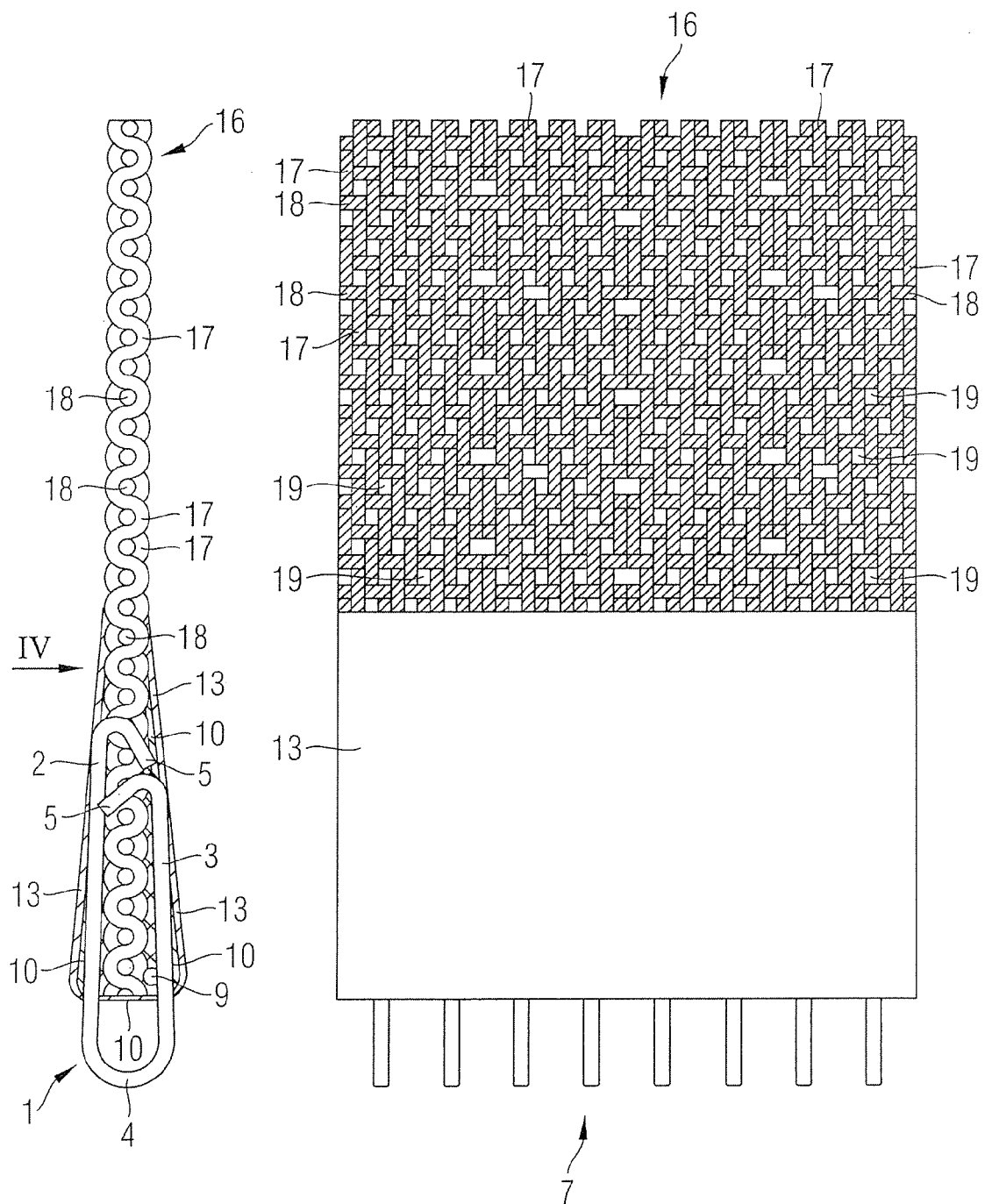
FIG. 3 shows the embodiment according to FIG. 1, and depicts a longitudinal section through the arrangement of belt and wire hooks connected thereto and furthermore depicts the shanks of the wire hooks and the cover elements covering the belt.
FIG. 4 depicts a view taken along IV of the arrangement according to FIG. 3.

For purposes of description herein, the terms "upper", "lower", "right", "left", "rear", "front", "vertical", "horizontal" and derivatives thereof shall relate to the invention as oriented in FIGS. 1 and 4. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

For the first embodiment, FIGS. 1, 3, and 4 depict a belt connector assembly having a plurality of wire hooks 1. Each wire hook 1 has a long shank 2 and a short shank 3, as well as a coupling loop 4 that connects the two shanks 2 and 3 to one another. The free end of each shank 2 and 3 is embodied as a hook section 5, with a tip 6 that faces the opposing shank. A plurality of wire hooks 1, comprising eight wire hooks 1 in the exemplary embodiment shown in FIGS. 1, 3, and 4, form a hook strip or assembly 7, wherein each successive wire hook 1 is being rotated 180° C. relative to the axis 8 shown in FIG. 1.

The lower shanks 2 and 3 of the hook assembly 7 (relative to the orientation according to FIG. 1) are laterally interconnected along the transition areas of the coupling loops 4 by means of a cross wire 9. Thus, the cross wire 9 positively positions wire hooks 1 relative to one another in a defined manner. The hook assembly 7 depicted in FIGS. 1, 3, and 4 is used with a plate-shaped cover sheet or element 10. The cover element 10 has a rectangular main surface, wherein the cross wire 9 is oriented parallel to the end edges of the cover element 10. The cover element 10 may be shaped similar to the cover element disclosed in EP 1 338 825 A1, for instance. In the illustrated example, cover element 10 is provided with eight parallel slots. Each slot receives therein one of the wire hooks 1 in the area of the coupling loops 4. Correspondingly, the slots are oriented parallel to the narrow edges of the cover element 10. Each slot is just long enough to receive therein an associated one of the wire hooks 1 in the area adjacent to the cross wire 9. Fundamentally, it is not necessary to have a cross wire 9, especially if the cover element 10 is sufficiently rigid for receiving and positioning the wire hooks 1.

The cover element 10 is arranged symmetrical with respect to the axis 8. The cover element 10 comprises a carrier material 11 and a thermoplastic coating 12 that covers an interior face of carrier material 11. The thermoplastic coating 12 is thus employed to connect the cover element 10 to one end of a conveyor belt in a manner to be described in greater detail. The carrier material 11 may be constructed from a fabric that is made of monofilament fibers having warp and weft threads. This type of carrier material 11 comprises for instance polyester or nylon threads. The thermoplastic coating 12 is for instance a coating that comprises polyurethane.

The belt connector illustrated in FIGS. 1, 3, and 4 has a second or additional cover element 13 that has two strips or sections. This additional cover element 13 is the same as the cover element 10 in terms of its structure and material pairing. Relative to the axis 8, the additional cover element 13 extends beyond the cover element 10 in the area of the free ends of the cover element 10. The additional element 13 is connected in the area of its thermoplastic coating 12 to the carrier material 11 of the cover element 10. Both sections of the additional cover element 13 nearly reach the coupling loops 4 for the wire hooks 1.

The carrier material 11 for each cover element 10 and 13 is preferably woven, having a fine mesh, so that only small spaces or pores exist between the warp threads 14 and the weft threads 15 of the carrier material 11.

FIGS. 3 and 4 illustrate the hook assembly 7 attached to one end of a conveyor belt 16. The conveyor belt 16 is constructed from a porous filtering fabric that may comprise polyester or nylon. The warp threads 17 and the weft threads 18 for the filtering fabric of the conveyor belt 16 are woven with a relatively wide mesh in order to ensure the function of the filtering fabric. A plurality of spaces or apertures 19 are formed between the warp threads 17 and the weft threads 18 of the conveyor belt 16. These spaces 19 do not have hash or cross section marks in the depiction in FIG. 4. The spaces 19 pass through the conveyor belt 16 perpendicular to its plane of conveyance. These spaces 19 also serve to anchor the cover element 10 in terms of providing a positive, mechanical fit connection, as described in greater detail below.

FIG. 3 illustrates the wire hooks 1 connected to one end of conveyor belt 16, and more clearly shows one of the wire hooks 1, with the first and second cover elements 10 and 13 covering portions of the wire hooks 1. The thermoplastic coating 12 of the first cover element 10 projects into the spaces 19 of the conveyor belt 16 due to plastic deformation. This is also the case for those areas of the second cover element 13 that extend beyond the first cover element 10, and come into contact with the adjacent face of conveyor belt 16. This positive connection between the thermoplastic coating 12 and the conveyor belt 16 in the area of the spaces 19 creates a durable connection between cover element 10 and the overlapping area of the cover element 13, and the conveyor belt 16. The first and second cover elements 10 and 13 also cover portions of the wire hooks 1, as is shown in FIGS. 3 and 4. The product of the thickness of the thermoplastic material of the cover element 10 and the surface area of cover element 10 should be approximately equal to, or preferably at least equal to, the volume of the spaces 19 of the underlying filtering fabric of conveyor belt 16. The thickness of the thermoplastic material in the cover elements 10 and 13 is selected in particular, such that the coating fuses the top side of the belt to the coating of the bottom side of the belt when heat is applied to produce the connection. This means that the thermoplastic coating 12 flows into the spaces 19 from both sides of the conveyor belt 16, and the two streams or fingers of thermoplastics connect to one another at about half the length of each of the pores or spaces 19, and subsequently harden therein to create a secure, durable tie or interconnection.

Figure 2:
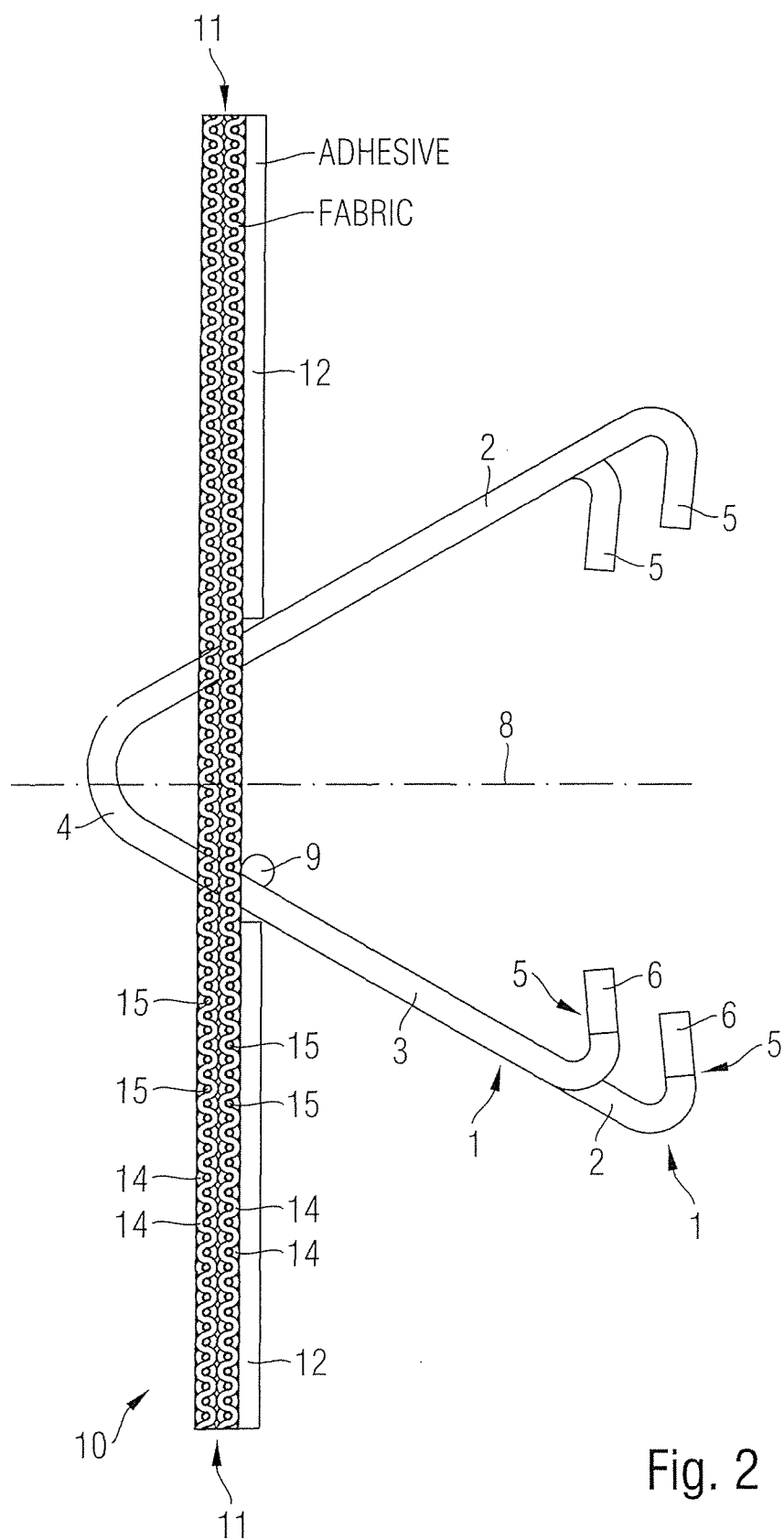
FIG. 2 illustrates a second exemplary embodiment of the invention, and depicts a side view of an arrangement of wire hooks held by means of a cross wire; the arrangement is used in a cover element.

FIG. 2 depicts another embodiment of the present invention that is distinguished from that according to FIG. 1 in that only the first cover element 10 is provided. However, the cover element 10 of FIG. 2 has a second layer of carrier material 11 that forms a unit, with a thermoplastic coating 12 on one side. This second layer of carrier material 11 is like the first layer of carrier member 11 used in the first embodiment according to FIGS. 1, 3, and 4, that is, it has warp threads 14 and weft threads 15. Thus, in contrast to the embodiment according to FIG. 1, in the embodiment according to FIG. 2, the increased layer thickness is produced by the double layer thickness of carrier material 11, without a thermoplastic coating 12 arranged between the two layers of carrier material 11. In addition, there are no overlapping areas of the carrier material 11, as there are in the embodiment according to FIG. 1.

Figure 5:
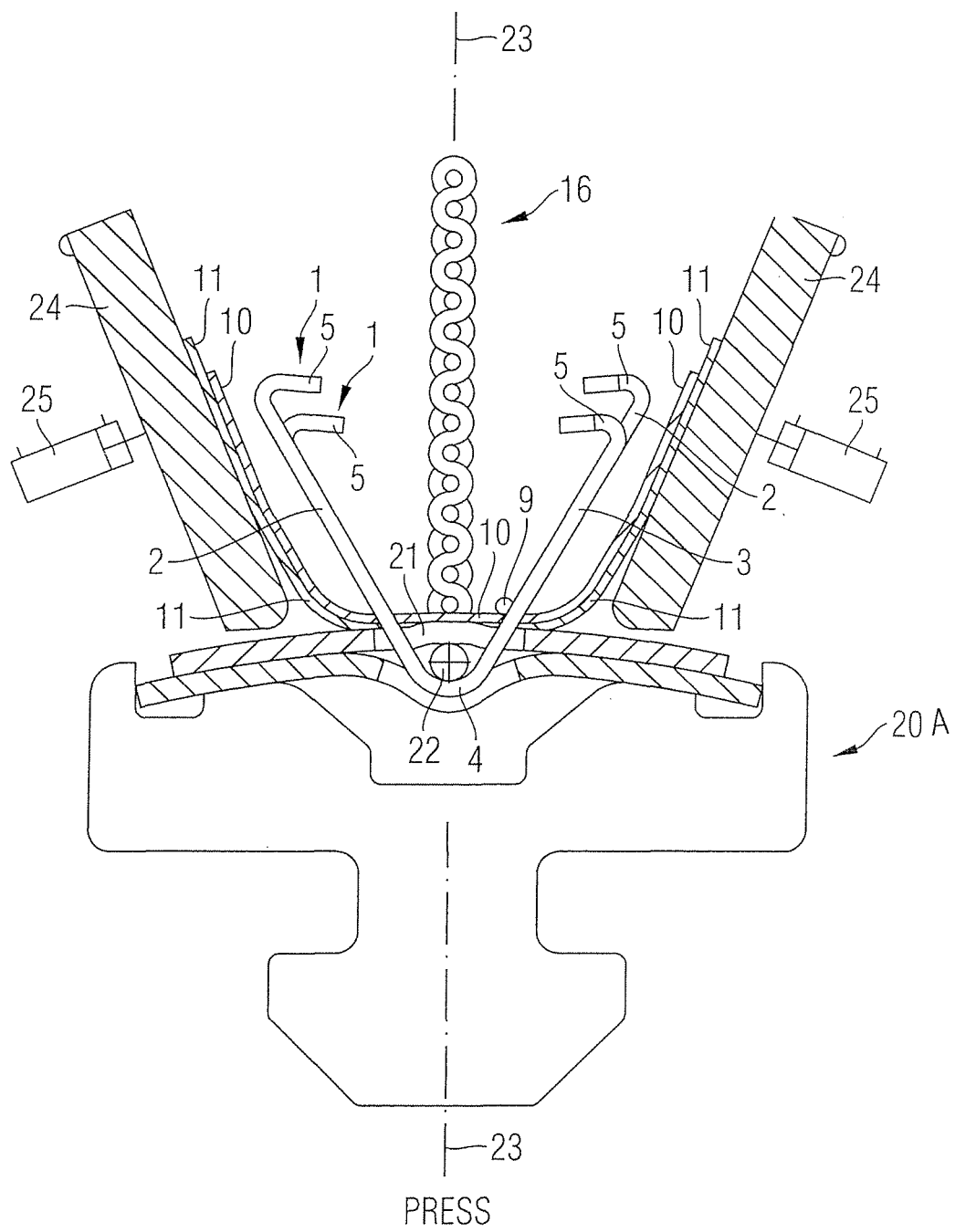
FIG. 5 depicts an apparatus for pressing the wire hooks that are received by the cover element and that are held in the apparatus into a belt end, prior to the pressing process.
Figure 6:
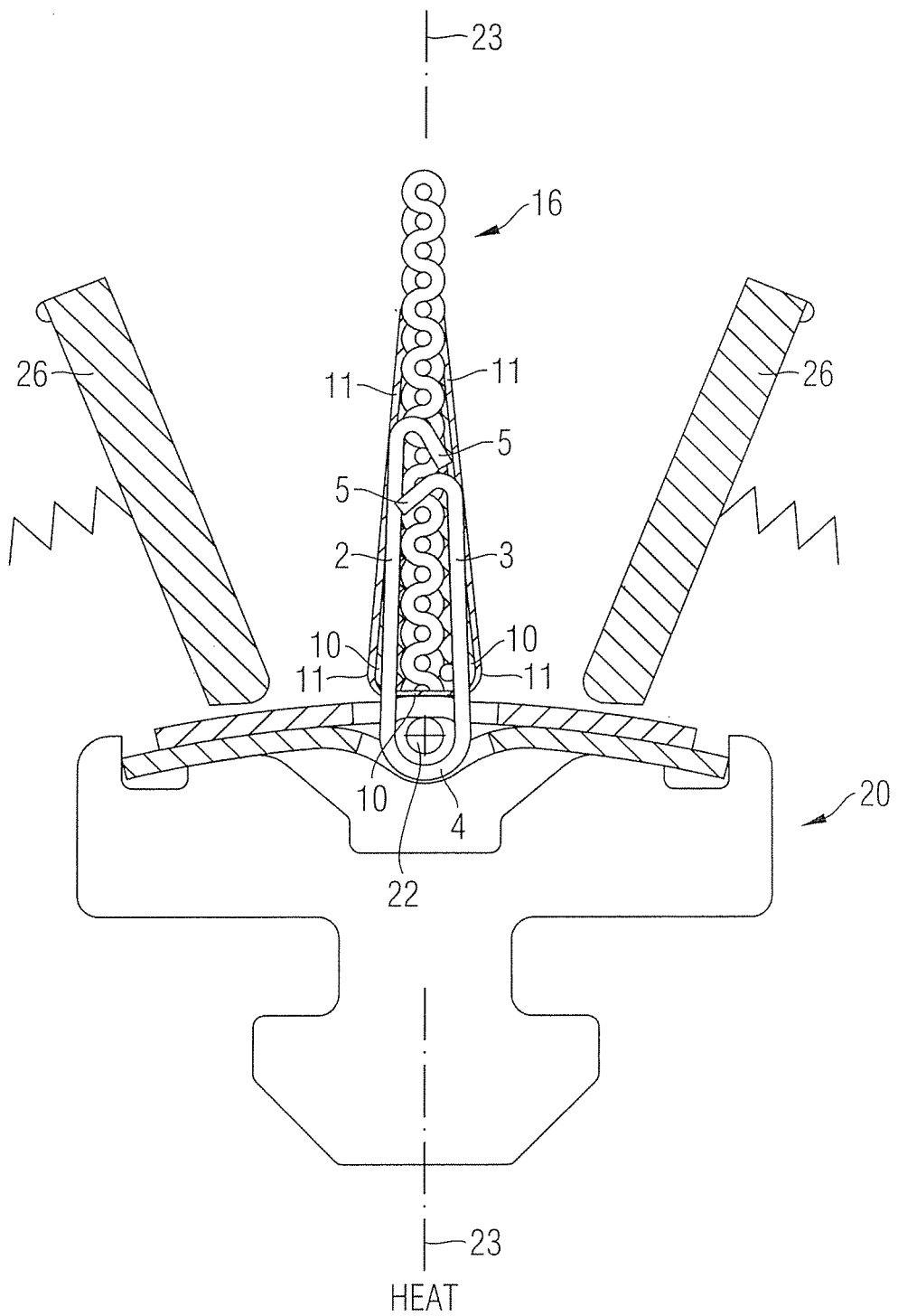
FIG. 6 is a depiction according to FIG. 5 of the condition of the wire hooks that are pressed into the belt end and of the cover elements that are linked when the wire hooks are pressed in, with separate heated heating jaws, prior to the heating jaws pressing onto the cover element.
Figure 7:
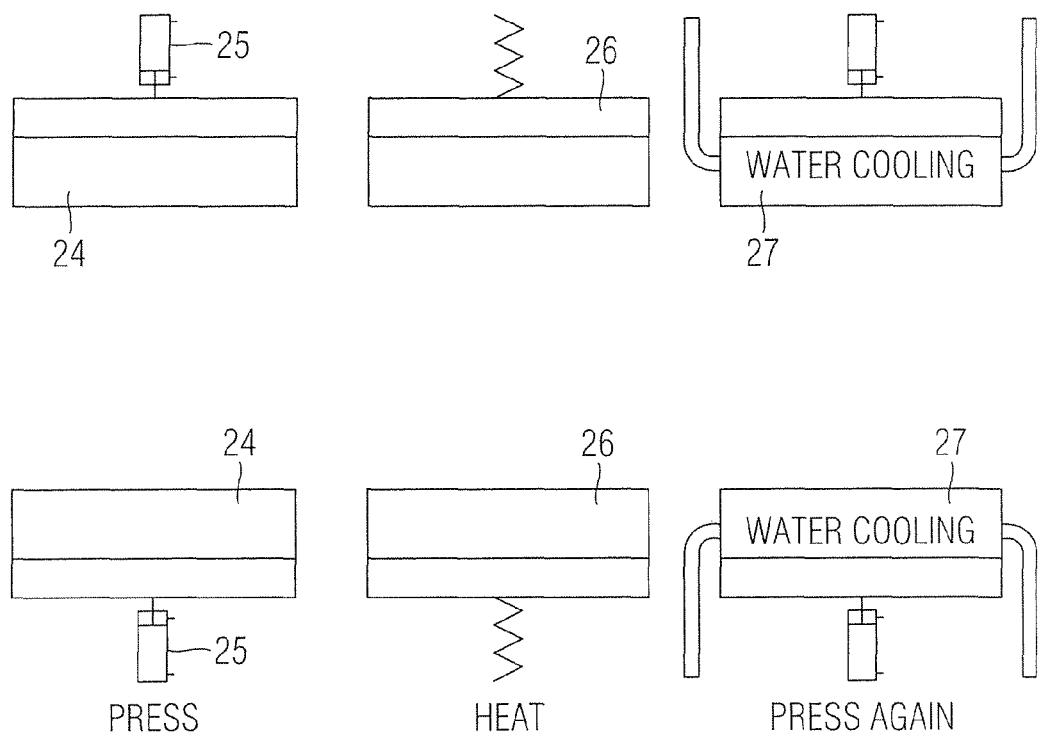
FIG. 7 depicts the method steps for pressing, then heating, then re-pressing.

FIG. 5 illustrates a method for attaching the wire hooks 1 to the end of the conveyor belt 16. The hook assembly 7 is held or retained in an apparatus or lacing machine 20, such as that described in EP 1 338 825 A1. Slots 21 in the apparatus 20 receive the wire hooks 1 in the area of the coupling loops 4, and a retaining rod 22 in the apparatus 20 fixes the hook assembly 7 therein. A pair of press jaws 24 are arranged symmetrically with the axis 23 of the apparatus 20. The press jaws 24 can be moved or converged towards the axis 23 by means of power means 25. The wire hooks 1 that are held together by the cross wire 9, pass through the slots in the first cover element 10 and are inserted into the apparatus 20, and then retained therein by the rod 22. One end of the conveyor belt 16 is inserted between the open shanks 2 and 3 of the wire hooks 1 in the axis 23, until the free end of the conveyor belt 16 contacts the cover element 10 positioned against the apparatus. Then, the wire hooks are clenched or pressed closed while cold or at ambient temperature. During this pressing process, the cover elements 10 and 13 are pre-fixed or retained in place, as shown in FIG. 6, wherein the wire hooks 1 and the conveyor belt 16 are interconnected. The wire hooks 1 are clenched or pressed closed at very high pressure (15.0 to 35.0 N/mm$^2$), whereas a subsequent heat connection process occurs at relatively low pressure (0.2 to 0.6 N/mm$^2$). This heating process typically takes place in a separate workstation, that is, not in the press station depicted in FIG. 5. Rather, it preferably takes place in a workstation arranged adjacent to the pressing station, as shown in FIG. 6, that has an appropriate heat connection apparatus 20. This second workstation (FIG. 6) has heating jaws 26 that can be moved or converged towards the axis 23. The heating jaws 26 are moved together or converged with relatively low pressure, starting from the position shown in FIG. 6, against the cover element 13 on both sides of the conveyor belt 16. The cover elements 13 and 10 are heated by jaws 26 until their thermoplastic coatings 12 become paste-like to liquid. FIG. 7 illustrates the pressing and heating stations according to FIGS. 5 and 6 on the left and in the center, and immediately after the heating according to FIG. 6, a third workstation is structured somewhat similar to the workstation shown in FIG. 5. More specifically, after the heating workstation shown in FIG. 6, the partially assembled belt connector and conveyor belt 16 are immediately transferred to the third workstation shown in FIG. 7 while the coatings 12 are still warm, wherein the plasticized thermoplastic material for the cover elements 10 and 13 is further pressed into the spaces 19 of the porous filtering fabric of the conveyor belt 16 by means of pressing jaws 27 under a pressure that is relatively high (5.0 to 25.0 N/mm$^2$) compared to the heating pressure (FIG. 6), but that is much lower than the pressure for clenching the wire hooks 1 (FIG. 5). The thermoplastic coatings 12 are then cooled immediately after the second pressing (FIG. 7), for instance by cooling the pressing jaws 27. The plasticized thermoplastic material 12 of the second cover element 13 penetrates into the relatively small spaces or pores of the carrier material 11 of the first cover element 10 in the area in which the second cover element 13 covers or overlaps with the first cover element 10.

In the inventive method, the thermoplastic coatings 12 are heated only just to their melting point, which is for instance 180° C. This melting point is clearly less than the melting point for the porous fabric of the conveyor belt 16, which is for instance 220° C. This ensures that the conveyor belt 16 does not deform when the thermoplastic coatings 12 plasticize. The connection between thermoplastic coatings 12 and the conveyor belt 16 is the result of the positive interlocking of the melted material of the carrier layers 11 in the spaces 19 of conveyor belt 16, and as plasticization progresses, it is further enhanced by the interconnection of the two streams of thermoplastic material that flow into both sides of the conveyor belt pores 19 and join together. The hot thermoplastic material penetrates into the same conveyor belt spaces 19 from the opposite ends of the spaces 19 and unite.

The invention claimed is:

1. In a method for interconnecting the opposite ends of a porous filtering belt, the improvement comprising:
   selecting a predetermined length of porous filtering belt with intersecting threads that form a plurality of pores therebetween which pass completely through the filtering belt in a direction generally perpendicular to the plane of conveyance of the filtering belt, and are of sufficient size to allow liquids from materials being dewatered, juiced or otherwise processed on the filtering belt to pass freely therethrough;
   providing a belt connector having a plurality of wire hooks spaced laterally along one end of the filtering belt, wherein each of the wire hooks has first and second shanks disposed adjacent to opposite faces of the one filtering belt end, a coupling loop interconnecting the first and second shanks at one end thereof, and first and second hook ends at an opposite end of the first and second shanks that are configured to be pressed into the opposite faces of the filtering belt;
   forming a flat cover element shaped to extend generally across the width of the one filtering belt end, and having a carrier material and a coating that is applied to that side of the carrier material facing the filtering belt, and is constructed from a thermoplastic or an adhesive material which plasticizes when heated to a predetermined plasticizing temperature;
   positioning the cover element over at least a portion of the belt connector;
   clenching the wire hooks until the first and second hook ends are pressed firmly into the opposite faces of the filtering belt along the one end thereof;
   folding the cover element over at least portions of the clenched wire hooks and against the opposite faces of the filtering belt along the one end thereof;
   heating the cover element to the predetermined plasticizing temperature to plasticize the coating; and
   pressing the plasticized coating into both of the opposite faces of the filtering belt along the one end thereof thereby flowing the plasticized coating through the pores in the filtering belt to define first and second streams of plasticized coating whose adjacent ends fuse together in the pores to positively and mechanically interlock the cover element and the filtering belt together to define a secure belt connection.

2. A method as set forth in claim 1, wherein:
said pressing step is performed after said clenching step and after said heating step.

3. A method as set forth in claim 1, wherein:
said clenching step is performed at a first workstation before said heating step;
said heating step is performed at a second workstation, and includes heating the cover element under relatively low pressure; and including
transferring the belt connection to a third workstation immediately after said heating step and said pressing step, and further pressing the plasticized coating of the cover element under relatively high pressure into the pores of the filtering belt; and
cooling the belt connection.

4. A method as set forth in claim 1, wherein:
said clenching step comprises pressing the wire hooks into the filtering belt at a pressure of 15.0 to 35.0 $N/mm^2$;
said heating step comprises heating the cover element at a pressure of 0.2 to 0.6 $N/mm^2$; and
said pressing step comprises pressing the plasticized coating of the cover element into the pores of the filtering belt at a pressure of 5.0 to 25.0 $N/mm^2$.

5. A method as set forth in claim 1, wherein:
said heating step is performed using friction, irradiation, ultrasound, heating plates, or hot air.

6. A method as set forth in claim 1, wherein:
said cover element forming step comprises selecting the carrier material from a material that has a melting temperature that is higher than the predetermined plasticizing temperature of the coating.

7. A method as set forth in claim 1, wherein:
said filtering material selecting step comprises selecting a filtering material constructed from plastic, metal, or a non-woven material, such as felt.

8. A method as set forth in claim 1, wherein:
said filtering material selecting step comprises selecting a filtering material made of polyester or nylon.

9. A method as set forth in claim 1, wherein:
said filtering material selecting step comprises selecting a filtering material made from a filtering fabric having monofilament fibers and/or spun fibers.

10. A method as set forth in claim 1, wherein:
said cover element forming step defines a first cover element forming step and including:
forming a second cover element and connecting the same with that side of the first cover element which faces away from the filtering belt.

11. A method as set forth in claim 10, wherein:
said second cover element forming step comprises positioning the second cover element in the longitudinal direction of the filtering belt, across end areas of said first cover element.

12. A method as set forth in claim 1, wherein:
said cover element forming step includes selecting the carrier material from a fabric having monofilament fibers and/or spun fibers.

13. A method as set forth in claim 1, wherein:
said cover element forming step includes making the carrier material from polyester or nylon.

14. A method as set forth in claim 1, wherein:
said cover element forming step includes making the thermoplastic coating from polyurethane.

* * * * *